Aug. 21, 1923.

L. LARSEN 1,465,716

CRADLING BOOM FOR CORDWOOD

Filed Aug. 28, 1922

INVENTOR:
Lars Larsen
BY
ATTORNEY

Aug. 21, 1923.
L. LARSEN
CRADLING BOOM FOR CORDWOOD
Filed Aug. 28, 1922
1,465,716
2 Sheets-Sheet 2
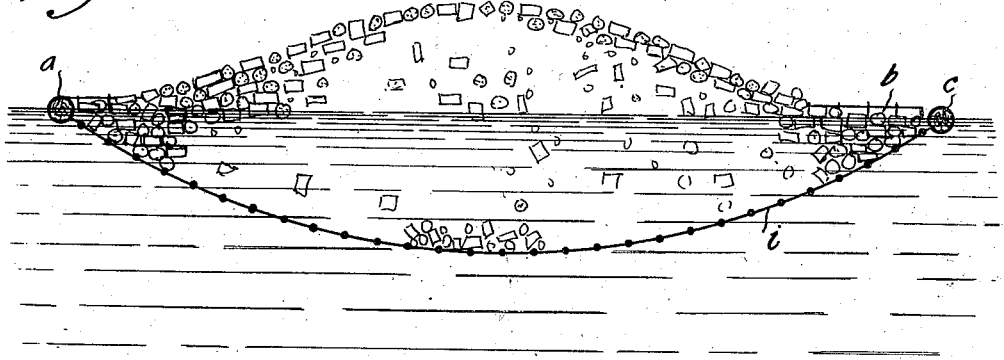
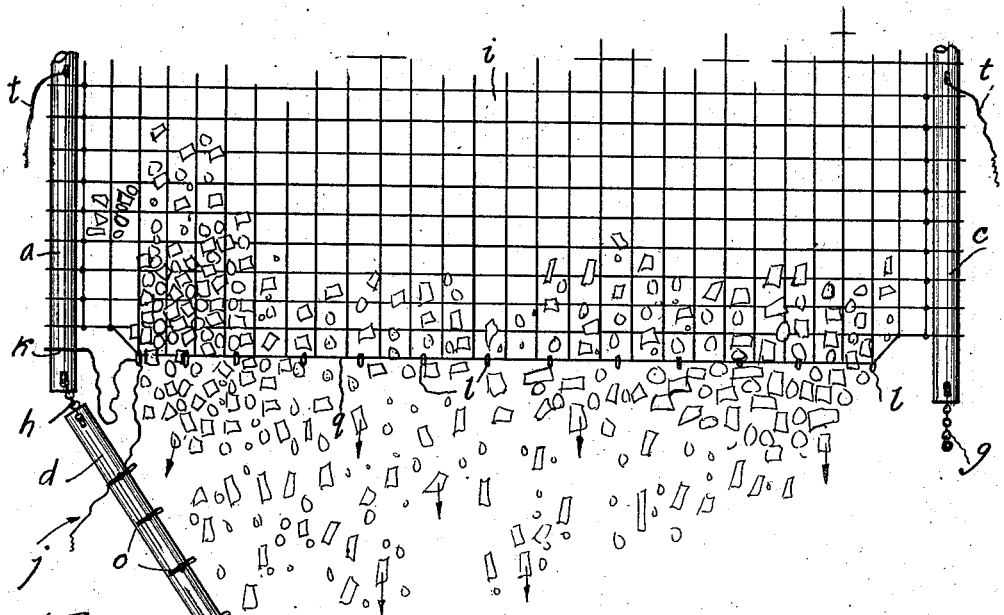
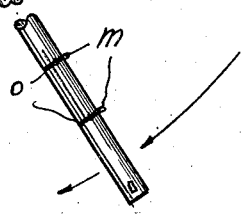
INVENTOR
Lars Larsen
BY
ATTORNEY Patented Aug. 21, 1923.

1,465,716

UNITED STATES PATENT OFFICE.

LARS LARSEN, OF OCEAN FALLS, BRITISH COLUMBIA, CANADA.

CRADLING BOOM FOR CORDWOOD.

Application filed August 28, 1922. Serial No. 584,900.

*To all whom it may concern:*

Be it known that I, LARS LARSEN, a citizen of the Dominion of Canada, and a resident of Ocean Falls, Province of British Columbia, Dominion of Canada, have invented a new and useful Improvement in Cradling Booms for Cordwood, of which the following is a specification.

The object of my invention is to provide means for conveying wood or wooden blocks or similar substances on a water way, which is adapted to be loaded and unloaded in a minimum amount of time.

Much difficulty has been encountered in transporting loose floatable objects such as cordwood because a great quantity has to be conveyed at one time to make it profitable and also the same must be transported with the minimum amount of handling. Scows and the like necessitate unloading by hand which renders them impractical for this use and floats, as now constructed, are not adaptable because the blocks are relatively small and are forced away from the retaining logs and are lost in transit.

My boom is made in the form of a cradle comprising a plural sided frame made of logs connected together at their adjacent ends, a net secured at all sides except one to adjacent members of said frame, means for releasably fastening the remaining side of the net to the other frame member, dogs adapted to be secured to one frame side, and provided with eyes, eyes provided on one frame member, a cable inserted thru the said eyes of said frame-member and said net side for lacing these parts together, whereby said net when fastened all the way around to the frame members constitutes a cradle for holding articles mentioned and the releasable side of said net may be unfastened to discharge these articles.

These and other objects I have attained in the device shown in the accompanying drawings, in which:

Fig. 3 is a diagrammatic representation of my cradling boom filled to capacity, with cordwood or wooden blocks; and Fig. 4 is a diagrammatic representation of a portion of my cradling boom and shows how the boom can be swung open to allow the blocks to be removed.

Figure 1:
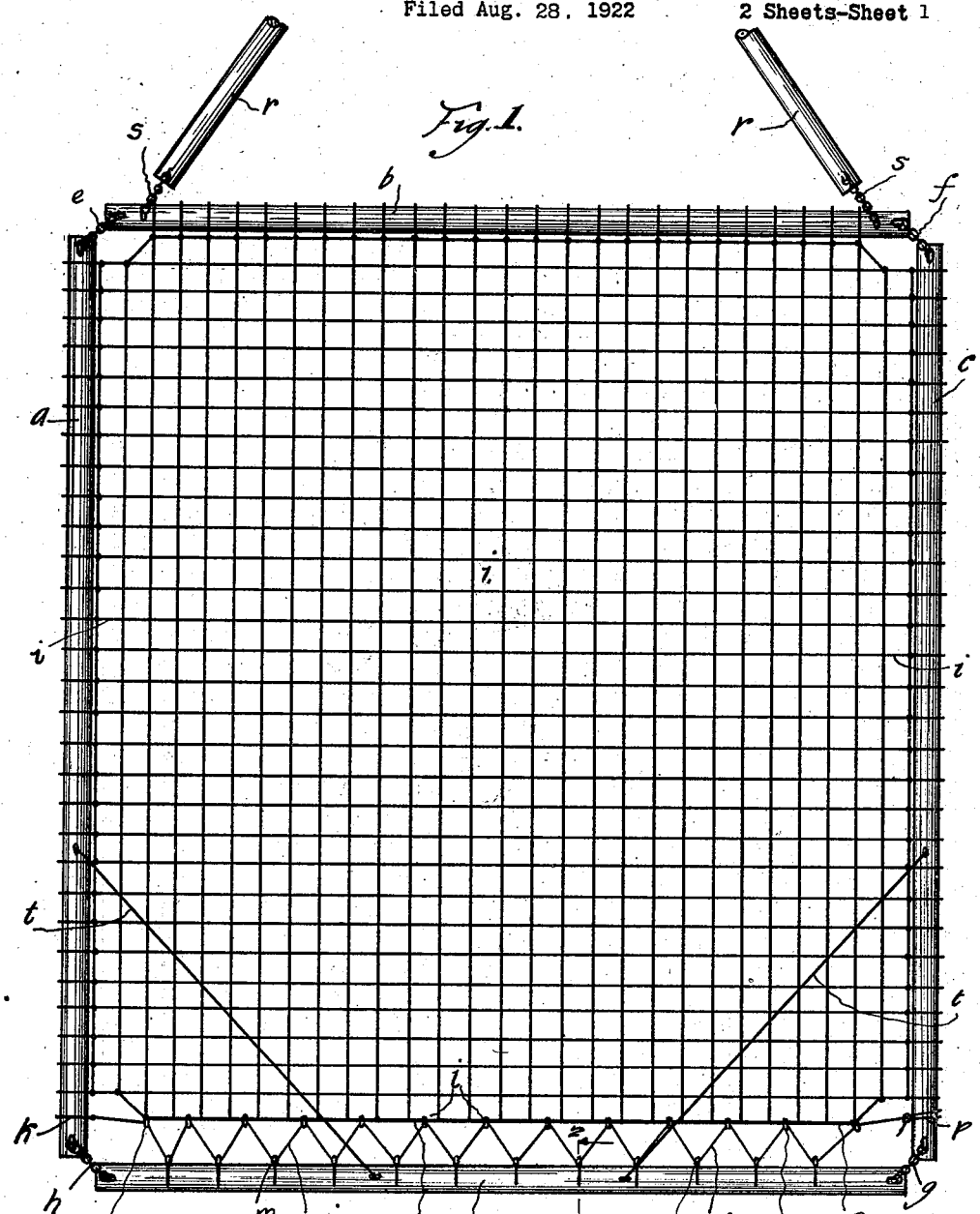
Fig. 1 is a plan view of my cradling boom and shows how the four sided frame is made up and braced.
Figure 2:
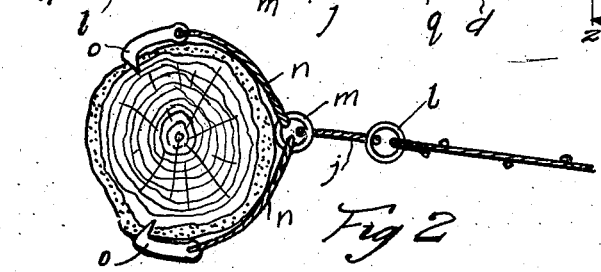
Fig. 2 is a section taken on the line 2—2 of Fig. 1 and shows how one frame member can be made releasable so as to allow the float to be swung out and allow the contents of the cradle to be floated out.

The boom is made up of a four-sided floating frame which is of sufficient buoyancy to float the meshed wires and a relatively large load. The frame is made of logs $a$, $b$, $c$ and $d$ which are held together in the water by chains $e$, $f$, $g$ and $h$. This frame supports a wire mesh of cable $i$ which is spaced so as to meet the conditions of usage of the boom. This mesh is connected to the boom on three sides, the other side $q$ being releasably secured to the log $d$ by means of the cable $j$. The cable $j$ is fastened at one end to the lower end of the log $a$ as at $k$ and is run thru a series of eyes $l$ which are fastened to one edge $q$ of the wire mesh. The cable $j$ is also run thru a series of eyes $m$ which are attached to the short sections of cable $n$ and attached to the log $d$. The sections of cable $n$ can either be wrapped around the log permanently or else fastened to the log $d$ by means of dogs $o$. The cable $j$ is alternately placed thru an eye $l$, thence thru an adjacent eye $m$ and thus thru another eye $m$ and so on until the boom log $d$ is laced to the mesh wire its entire length. The other end of the cable is removably secured to the boom log $c$ as at $p$ and the releasable boom chain $g$ is also releasably fastened to the adjacent ends of the boom logs $c$ and $d$. The raft is then in condition to float articles down the water way. The cradling boom is rapidly filled by dumping the product onto the raft or piling the material on. The boom logs $a$, $b$, $c$ and $d$ are of sufficient size to hold the edges of the mesh wire above the water and thus preventing any of the material being conveyed, from being floated off.

In rough water a wire mesh can be placed over the top of the load to hold the same from being washed off by the waves, or any variation such as throwing ropes over the top of the float can be used to combat the weather conditions. When the float has reached its destination these supporting ropes or mesh can be removed from the top of the load and the cable $j$ can be untied and the boom chain $g$ can be released. The cable can be removed from the eyes and allow the boom $d$ to be floated out as shown in Fig. 4. This allows the edge $q$ of the wire mesh to drop below the surface of the water because of the release of its float and thus allows the contents to be floated off rapidly.

Tow logs $r$ are fastened to the member $b$ by chains $s$ to provide a means for towing the boom. Bracing cables $t$ can be placed across the corners of the boom to prevent buckling.

I claim:

1. A boom of the character described, comprising a plural sided frame made of elongate floats connected together at their adjacent ends, a net secured at all sides except one to adjacent members of said frame, means for releasably fastening the remaining side of the net to the other frame member, whereby said net when fastened all the way around to the frame members constitutes a cradle for holding articles mentioned and the releasable side of said net may be unfastened to discharge these articles.

2. A boom of the character described, comprising a plural sided frame made of elongate floats connected together at their adjacent ends, eyes provided on one frame member, a net fastened at all sides except one to adjacent members of said frame, and provided with eyes along its remaining side, and a cable inserted thru the said eyes of said frame-member and said net side for lacing these parts together.

3. A boom of the character described, comprising a plural sided frame made of elongate floats connected together at their adjacent ends, eyes provided on one frame member, a net fastened at all sides except one to adjacent members of said frame, and provided with eyes along its remaining side, a cable inserted thru the said eyes of said frame-member and said net side for lacing these parts together, whereby said net when fastened all the way around to the frame members constitutes a cradle for holding articles mentioned and the releasable side of said net may be unfastened to discharge these articles.

4. A boom of the character described, comprising a plural sided frame made of logs connected together at their adjacent ends, dogs adapted to be secured to one frame side and provided with eyes, a net fastened at all sides except one to adjacent members of said frame, and provided with eyes along its remaining side, a cable inserted thru the said eyes of said frame-member and said net side for lacing these parts together, whereby said net when fastened all the way around to the frame members constitutes a cradle for holding articles mentioned and the releasable side of said net may be unfastened to discharge these articles.

LARS LARSEN.